(12) United States Patent
Kang et al.

(10) Patent No.: US 6,327,359 B1
(45) Date of Patent: Dec. 4, 2001

(54) METHOD FOR PROVIDING PERSONAL INFORMATION TO CALL CENTERS USING INTELLIGENT NETWORK

(75) Inventors: Tae Gyu Kang; Seong Yong Bae; Se Hyeong Cho; Kyung Pyo Jun, all of Taejon (KR)

(73) Assignees: Electronics and Telecommunications Research Institute, Taejeon; Korea Telecom, Kyoungki-Do, both of (KR)

( * ) Notice: Subject to any disclaimer, the term of this patent is extended or adjusted under 35 U.S.C. 154(b) by 0 days.

(21) Appl. No.: 09/209,007

(22) Filed: Dec. 11, 1998

(30) Foreign Application Priority Data

Nov. 24, 1998 (KR) .................................................. 98-50421

(51) Int. Cl.⁷ .................................................. H04M 7/00
(52) U.S. Cl. .................................. 379/221.08; 379/88.19; 379/88.21; 379/93.03; 379/93.23; 379/142.01; 379/142.06; 379/207.13; 379/207.15; 379/221.09; 379/221.12
(58) Field of Search ............................ 379/88.21, 93.03, 379/93.23, 127, 142, 245, 207, 220, 142.01, 207.13, 207.14, 207.15, 221.08, 221.09, 221.12

(56) References Cited

U.S. PATENT DOCUMENTS

| | | |
|---|---|---|
| 5,715,307 | 2/1998 | Zazzera . |
| 5,751,795 | 5/1998 | Hassler et al. . |
| 5,793,852 | 8/1998 | Kang et al. . |
| 5,852,657 * | 12/1998 | Malik et al. ...................... 379/93.25 |
| 5,903,636 * | 5/1999 | Malik ................................... 379/142 |
| 5,982,866 * | 11/1999 | Kowalski ........................ 379/127.01 |
| 6,101,246 * | 8/2000 | Heinmiller et al. ............ 379/142.01 |
| 6,178,232 * | 1/2001 | Latter et al. ...................... 379/88.21 |

* cited by examiner

Primary Examiner—Ahmad Matar
Assistant Examiner—Bing Bui
(74) Attorney, Agent, or Firm—Antonelli, Terry, Stout & Kraus, LLP

(57) ABSTRACT

A method for providing personal information which can overcome the duplication and redundancy of personal information and regional limitation, includes building a Computer Telephony Integration (CTI) information database, a personal information database, and a destination information database in a Service Control Point (SCP), to provide the personal information to CTI destination terminals in an intelligent network; transferring, by a Service Exchange Point (SSP), a calling line identification (CLI) and a dialing number (DN) to the SCP when an originating subscriber dials, retrieving a personal information and a destination information from said databases, and transferring the CLI and the retrieved personal information and destination information to the SSP; and providing, by the SSP, the CLI and the personal information to the destination terminals.

18 Claims, 10 Drawing Sheets

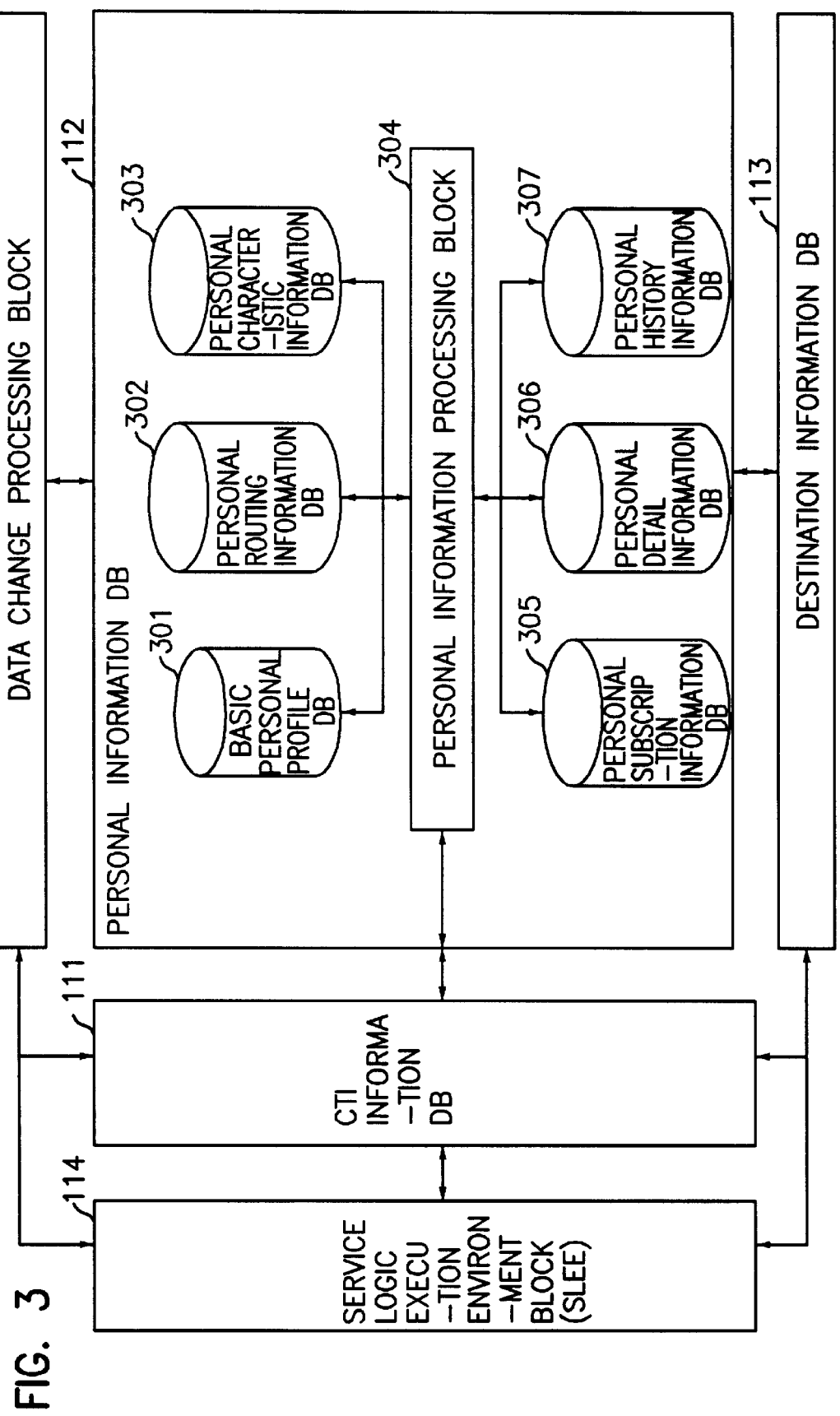

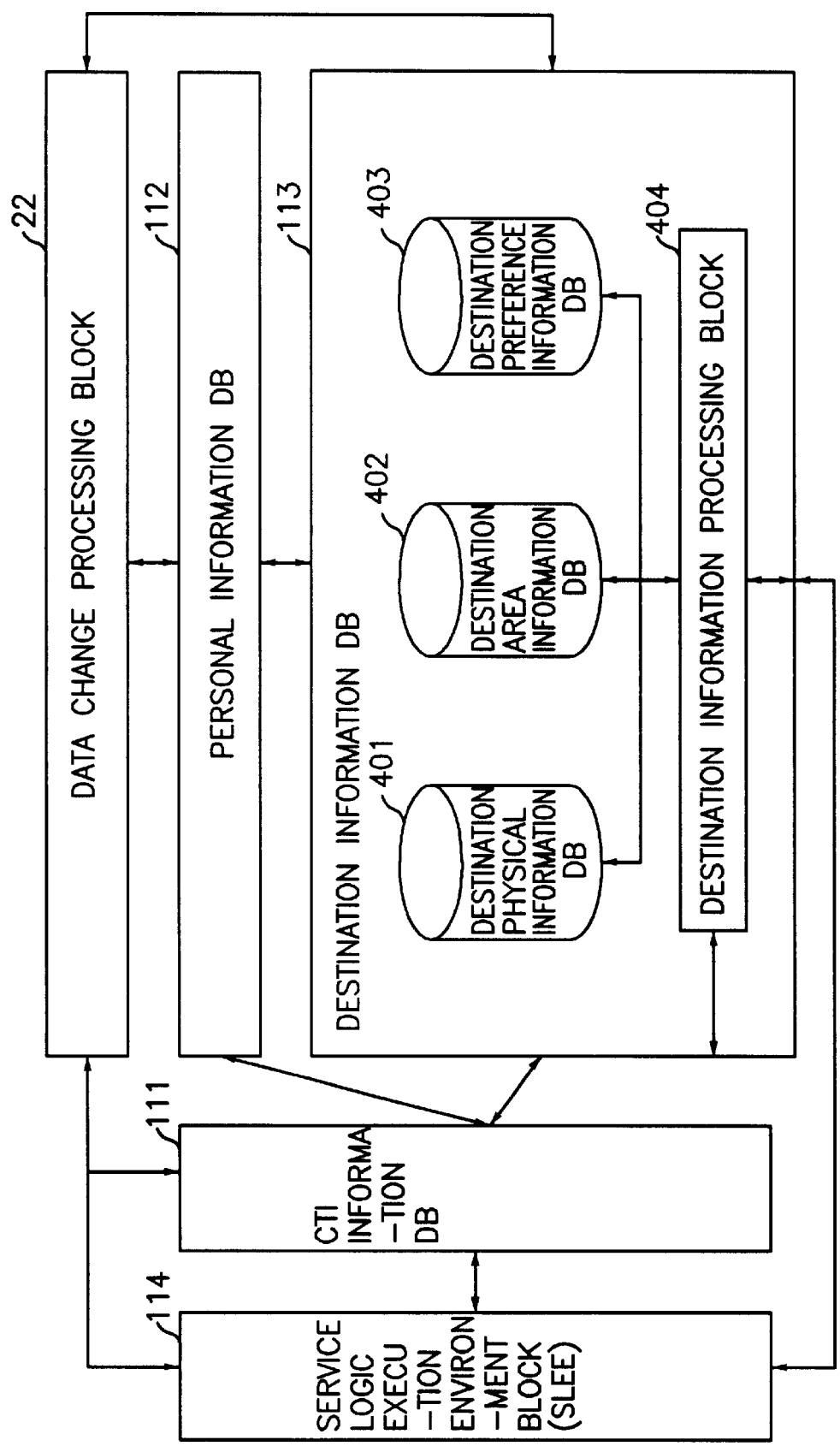

FIG. 5A

/ 201
CTI SUBSCRIPTION INFORMATION DB

| | |
|---|---|
| DN | — 501 |
| CTI SUBSCRIBER IDENTIFICATION CODE | — 502 |
| CTI REQUEST CHARACTERISTIC CODE | — 503 |
| CTI PROCESSING INFORMATION CHARACTERISTIC CODE | — 504 |
| CTI CHARACTERISTIC INFORMATION CODE | — 505 |

FIG. 5B

/ 202
CTI REQUEST INFORMATION DB

| | |
|---|---|
| CTI REQUEST CHARACTERISTIC CODE | — 511 |
| REQUEST LIST LENGTH | — 512 |
| IST. REQUEST | — 513 |
| 2ND. REQUEST | — 514 |
| N-TH. REQUEST | — 515 |

FIG. 5C

/ 203
CTI ANNOUNCEMENT INFORMATION DB

| | |
|---|---|
| ANNOUNCEMENT BROADCASTING | — 521 |
| ANNOUNCEMENT BROADCASTING REQUEST CODE | — 522 |

/205
CTI PROCESSING INFORMATION DB

| CTI PROCESSING INFORMATION CHARACTERISTIC CODE | —531 |
| CTI PROCESSING INFORMATION CLASSFICATION | —532 |
| CTI SUBSCRIBER DEFINITION PROCESSING INFORMATION | —533 |

/206
CTI PROVISION INFORMATION DB

| DN | —541 |
| INFORMATION PROVISION | —542 |

/208
CTI CHARACTERISTIC INFORMATION DB

| CTI CHARACTERISTIC INFORMATION CODE | —551 |
| CTI CHARACTERISTIC INFORMATION | —552 |

FIG. 6A

301
BASIC PERSONAL PROFILE DB

| | |
|---|---|
| CLI | 601 |
| RESIDENT REGISTRATION NUMBER | 602 |
| ADDRESS | 603 |
| NAME OF WORK PLACE | 604 |
| NAME OF SPOUSE | 605 |
| NATIONALITY | 606 |

FIG. 6B

302
PERSONAL ROUTING INFORMATION DB

| | |
|---|---|
| CLI | 611 |
| ROUTING CONDITION | 612 |
| ROUTING PREFERENCE INFORMATION | 613 |

FIG. 6C

303
PERSONAL CHARACTERISTIC INFORMATION DB

| | |
|---|---|
| CLI | 621 |
| PERSONAL PROCESSING ABILITY | 622 |

FIG. 7A

401
DESTINATION PHYSICAL INFORMATION DB

| | |
|---|---|
| DN | 701 |
| DESTINATION PREFERENCE INFORMATION CODE | 702 |
| DESTINATION AREA INFORMATION CODE | 703 |
| DESTINATION PHYSICAL NUMBER | 704 |

FIG. 7B

402
DESTINATION AREA INFORMATION DB

| | |
|---|---|
| DESTINATION AREA INFORMATION CODE | 711 |
| DESTINATION AREA NUMBER | 712 |

FIG. 7C

403
DESTINATION PREFERENCE INFORMATION DB

| | |
|---|---|
| DESTINATION PREFERENCE INFORMATION CODE | 721 |
| DESTINATION AREA NUMBER | 722 |

METHOD FOR PROVIDING PERSONAL INFORMATION TO CALL CENTERS USING INTELLIGENT NETWORK

BACKGROUND OF THE INVENTION

1. Technical Field

The present invention relates to a method for providing personal information to Computer Telephony Integration destination terminals in a telecommunication system. More particularly, the present invention directs an information provision method and computer readable medium for performing such a method, which can provide to the CTI destination terminals with originating subscriber's information comprised of calling line identification and personal information, by adding the personal information to the routing process for the destination subscribers in an intelligent network structured communication system.

2. Description of the Related Arts

Computer Telephony Integration (CTI) is a dynamic link between callers and information systems, and combines the speed and intelligence of a computer with the ease of use and access of a telephone. With the rapid progress of the CTI technology, call centers can provide larger information such as after-sales service data of electronic products, insurance information of an insurance company, and reservation and/or scheduling information of an aviation company, more rapidly in higher volume and in lower cost, to customers who make calls. The call center (also called destination terminals) is centralized facility that handles a myriad of inbound (incoming) and/or outbound (outgoing) telephone calls in a methodical and organized manner.

The existing CTI technology, however, uses only calling line identification (CLI), and is implemented by making use of terminal equipments such as computers and Private Branch exchange (PBX). With this structure, because the personal information of the caller is managed by the CTI enabled computer terminal according the CLI, information of the same customer should be managed separately in each of the terminal equipments, which results in a problem of redundant and duplicated management. Moreover, since the conventional CTI uses the PBX technology, the terminals of the call centers are limited in territorial coverage.

In the traditional CTI technology, the caller (or originating subscriber) information obtained from the calling line identification is used to identify a specific personal information which is appeared on the call center (i.e., destination terminal). This prior art requires large-scaled computer system and higher cost in maintaining and supervising the customer information, since the customer information is separately managed and processed by each of the call centers (destination terminals). Moreover, since the conventional CTI technology uses the PBX applications, personnel needed for the call center must work in a limited area.

SUMMARY OF THE INVENTION

To overcome the above mentioned problems of the prior art, the present invention provides a method for providing personal information which can overcome the duplication and redundancy of personal information and regional limitation and computer readable medium for implementing the method, wherein caller(originating) call subscriber information comprised of calling line identification (CLI) and the personal information is passed to CTI call centers (destination terminals) by adding the personal information of those who makes the caller (originating) outgoing call to the routing process (number translation) function for the incoming call subscriber information of Intelligent Network in a communication system.

According to one aspect of the present invention, a method for providing personal information comprises the steps of: building a CTI information database, a personal information database, and a destination information database in a SCP, to provide the personal information to CTI destination terminals in an intelligent network; transferring, by a SSP, a CLI and a DN to the SCP when an originating subscriber dials, retrieving a personal information and a destination information from said databases, and transferring the CLI and the retrieved personal information and destination information to the SSP; and providing, by the SSP, the CLI and the personal information to the destination terminals.

According to another aspect of the present invention, computer-readable medium has a program recorded thereon, where the program is to make a telecommunication system comprising high capability processor execute procedures of: building a CTI information database, an personal information database, and a destination information database in a SCP, to provide the personal information to CTI destination terminals in an intelligent network; transferring, by a SSP, a CLI and a DN to the SCP when an originating subscriber dials, retrieving a personal information and a destination information from said databases, and transferring the CLI and the retrieved personal information and destination information to the SSP; and providing, by the SSP, the CLI and the personal information to the destination terminals.

These and other characteristics of the present invention are more fully shown and described in the drawings and detailed description of this invention. It is to be understood, however, that the description and drawings are for the purpose of illustration and should not be read in a manner that would unduly limit the scope of this invention.

BRIEF DESCRIPTION OF THE DRAWINGS

The above and other objects and features of the instant invention will become apparent from the following description of preferred embodiments taken in conjunction with the accompanying drawings, in which:

FIG. 3 shows exemplary database for personal information according to the present invention;

FIG. 4 is an exemplary database of the destination information according to the present invention;

FIGS. 5a to 5f show structures of CTI information database management table of the present invention;

FIGS. 6a to 6f show the structures of management tables for the personal information database;

FIGS. 7a to 7c show structures of management tables for the destination information database according to the present invention.

DETAILED DESCRIPTION OF THE INVENTION

Figure 1:
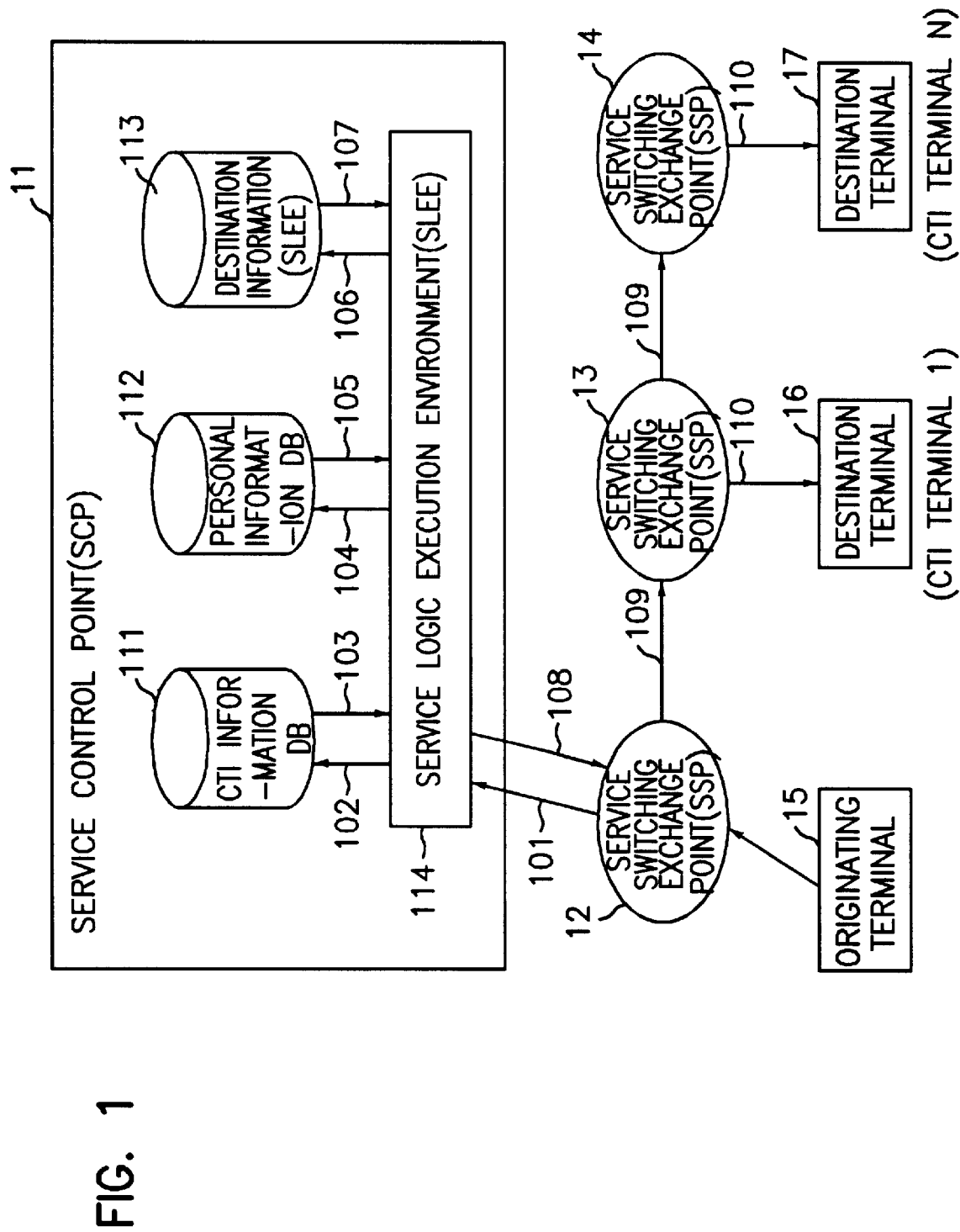
FIG. 1 illustrates a procedure for providing personal information in an intelligent network which provides the personal information to call centers according to the present invention.

FIG. 1 illustrates a procedure for providing personal information in an intelligent network which provides the personal information to call centers according to the present invention.

The intelligent network of the present invention for providing personal information to the call centers comprises originating terminals 15, destination terminals (i.e., call centers) 16 and 17 which are CTI terminals, Service Switching Exchange Points 12 to 14, and Service Control Point 11. The SCP 11 is provided with CTI information database 111, personal information database 112, destination information database 113, and Service Logic Execution Environment 114.

In above structured intelligent network, the personal information can be provided according to the below procedures.

First, when the originating terminal 15 punches in a Dialing Number of the destination terminal (call center) 16 and 17, this is detected by the SSP 12 and then the CLI+DN 101 is transferred to the SCP 11.

Next, the SCP 11 processes, by using the internal SLEE 114, the CLI+DN 101 received from the SSP 12. At this time, the SLEE 114 retrieves the CTI database 111 to see whether the received CLI+DN 102 is call center operation number or not.

If the received data is the call center operation number, personal information request 103 needed for the call center operation is sent to the personal information database 112. On the other hand, if the received data is not the call center operation number, the destination number database 113 is retrieved, but without retrieving the personal information database 112, to perform the destination call routing.

When the personal information database 112 receives the personal information request with the CLI+personal information request 104, personal information 105 corresponding to the request is retrieved from the personal information database 112 and transferred to the SLEE 114. After the retrieval of the personal information is completed, the destination number 107 is retrieved from the destination information database 113 by using the CLI+DN 106. In this context, the destination number 107 means the terminal identification telephone number of the call centers 16 and 17 to be connected actually.

Then, CLI+destination number+personal information 108 is provided to the SSP 12, when the SLEE 114 receives the destination number 107. After that, the SSP 12 provides, according to the destination number, the CLI+destination number+personal information 109 for the corresponding SSP 13 or 14.

Finally, depending on the destination number, the SSP 13 or 14 transports CLI+personal information 110 to the destination terminal (CTI terminal) 16 or 17. In the prior art Intelligent Network, what is managed is just the destination information database 113. And, the CTI information database 111 and personal information database 112 are not controlled. Accordingly, in the conventional CTI, the management is practiced by a CTI computer which controls numerous CTI terminals.

However, the CTI information database 111 and the CTI personal information database 112 in the present invention show different structure from those of the conventional CTI. Specifically, while the conventional CTI information database requires minimum information useful for only itself, the present invention's CTI information database manages information according to all of the CTI characteristics in a database. Further, compared with the conventional personal information database in which data is constructed at random according to the destination terminals (CTI terminals, call centers) 16 and 17, the personal information database 112 of the present invention manages, in a definite and standard database form, the personal information which meets all CTI.

Accordingly, in this embodiment, a database for CTI company information and personal information is newly constructed in SCP 111 of the intelligent network which provides personal information to the call centers (destination terminals) 16 and 17, so that these company and personal information can be used in a call connection. Now, the procedure for building the CTI information database 111, personal information database 112, and destination information database 113 will be explained.

Figure 2:
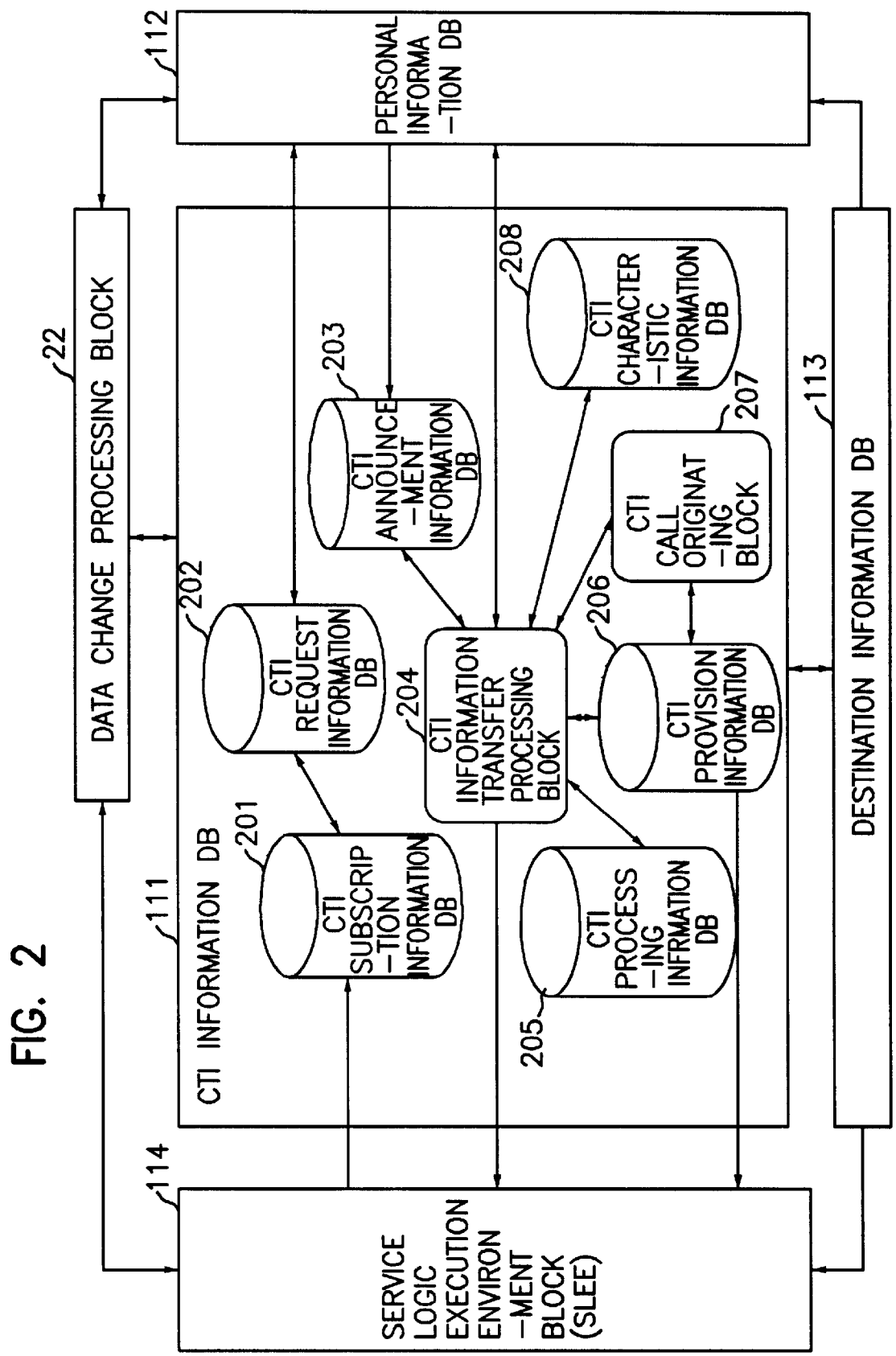
FIG. 2 shows an exemplary CTI information database of the present invention.

FIG. 2 shows an exemplary CTI information database of the present invention. The CTI information database 111 manages and processes information of CTI subscribers for providing the personal information to the destination terminals (call centers, CTI terminals) 16 and 17. The CTI information database 111 has relationship with the SLEE 114, data change processing block 22, personal information database 112, and destination information database 113 by a predetermined interface.

As shown in FIG. 2, the CTI information database 111 comprises CTI subscription information database 201, CTI request information database 202, CTI announcement information database 203, CTI information transfer processing block 204, CTI processing information database 205, CTI provision information database 206, CTI call originating block 207, and CTI characteristic information database 208.

The CTI subscription information database 201 checks the received DN to see that the DN is registered in the CTI, and, if so, the CTI request data is retrieved and recorded into the CTI request information database 202.

The CTI announcement information database 203 contains message contents and announcement broadcasting contents necessary for the CTI processing. It should be noted that whether or not the CTI announcement information database 203 is to be used is determined based on the processing status of a service logic but not based on the DN.

The CTI information transfer processing block 204 has a function to generalize the CTI information database 111. The CTI processing information database 205 is to define CTI processing information characteristic codes. The CTI provision information database 206 defines the information provision depending on the DN.

The CTI call originating block 207 determines whether a call is generated from the SCP 11 or not.

The CTI characteristic information database 208 defines CTI characteristic information codes.

FIG. 3 shows exemplary database for personal information according to the present invention. The personal information database 112 manages and processes information of CTI subscribers to provide the personal information to the destination terminals (call centers, CTI terminal equipment) 16 and 17. The personal information database 112 has a relationship with the SLEE 114, CTI information database 111, the data change processing block 22 and the destination information database 113 with a preset protocol therewith.

Referring to FIG. 3, the personal information database 112 contains basic personal profile database 301, personal routing information database 302, personal characteristic information database 303, personal information processing block 304, personal subscription information database 305, personal detail information database 306, and personal history information database 307.

The personal information processing block 304 is a generalized processing block for the basic personal profile database 301, the personal routing information database 302, the personal characteristic information database 303, and the personal subscription information database 305 which are managed by the personal information database 112. The personal information database 112 contains, in the form of a database, the personal information of the CTI subscribers.

In this embodiment, the personal information database 112 is managed by the SCP 11, while, in the conventional system, the personal information is managed by the CTI computers connected to the destination terminals. This difference of the present invention makes it possible to manage intended data more efficiently and to solve the duplication or the redundancy of the personal information.

Data contained in the basic personal profile database 301 is fundamental information every subscribers can take.

The personal routing information database 302 contains data for allocating destination a specific subscriber prefers.

The personal characteristic information database 303 contains data regarding the personal processing database. In other words, the information in the database 303 relates to the type of the resources (e.g., facsimile, e-mail, ISDN, and image or video information) which can be received from the destination subscribers.

The personal subscription information database 305 provides data about DN services the customers have subscribed a specific service such as car insurance of company A, life insurance of company C, mileage service of aviation company B, credit card D, and electronic product of model number E.

The personal detail information database 306 contains specific information which is peculiar to a certain subscriber and is not suitable to be standardized.

In the personal history information database 307, history data of subscriber's DN and service names.

FIG. 4 is an exemplary database of the destination information according to the present invention. The destination information database 113 manages and processes the CTI subscriber's information to convey the destination information to the destination terminals (call centers, CTI terminal equipments) 16 and 17.

The destination information database 113 has, with a preset protocol, a relationship with the SLEE 114, the CTI information database 111, the data change processing block 22 and the personal information database 112.

The destination information database 113 is provided with destination physical information database 401, destination area information database 402, destination preference information 403 and destination information processing block 404.

The destination information database 113 has a capability to interconnect the DN to the CTI terminals 16 and 17.

The destination physical information database 401 contains the CTI terminal information by the dialed number DN.

The destination area information database 402 has data for selecting one of the CTI terminals 16 and 17 according to area where the originating subscriber is present. The destination preference information database 403 contains information used to select one of the CTI terminals 16 and 17 according to the data of the originating subscribers in the personal information database 112.

The destination information processing block 404 is to process the destination physical information database 401, the destination area information database 402 and the destination preference information database 403 which are included in the destination information database 113. FIGS. 5a to 5f show structures of CTI information database management table of the present invention, and each of which illustrates the tables respectively corresponding to the CTI subscription information database 201, the CTI request information database 202, the CTI announcement information database 203, the CTI processing information database 205, the CTI provision information database 206 and the CTI characteristic information database 208 included in the CTI information 111 shown in FIG. 2.

The management table for the CTI information database 111 contains data of the CTI subscribers registered in the intelligent network CTI. These tables have differentiated points in that the common data of the request information, which was implemented by the conventional CTI server system, is implemented in the service control system 11.

With this embodiment, since the common data is implemented in the intelligent network control system 11, cost to implement the common data is greatly reduced and the regional limitation due to the CTI terminals 16 and 17 can be eliminated by the management table for the CTI information database 111.

As shown in FIG. 5a, the management table for the CTI subscription information database 202 is comprised of Dialing number DN 501, CTI subscriber identification codes 50, CTI request characteristic codes 503, CTI processing information characteristic codes 504, and CTI characteristic information codes 505.

The management table for the CTI subscription information database 202 has data for the CTI subscribers who are registered in the CTI intelligent network and provided with the CTI service.

The dialing number DN 501 is an virtual number the physical CTI subscriber who is dialed by the originating subscriber.

The CTI subscriber identification codes 502 are code values for identifying the destination subscriber in the CTI virtual number 501. With this structure of the CTI subscriber identification codes in this embodiment, it is defined according to the CTI subscriber's characteristics The CTI request characteristic codes 503 represent code values for the list of the personal information which is requested by the CTI subscribers. These codes are defined by the management of the CTI request information database 202 shown in FIG. 5b.

The CTI processing information characteristic codes 504 indicate code values for the characteristic according to the CTI processing ability. These codes are defined by the management table for the CTI processing information database 203 shown in FIG. 5c. In this structure of the CTI processing information characteristic codes 504 of the embodiment, interconnection is carried properly depending on the processing ability before the connection between the originating call and the destination call, so that unwanted interconnection can be prevented.

The CTI characteristic information codes 505 indicate the characteristics according to the CTI classification. For example, the codes 505 can be defined by the classification of insurance company, aviation company, newspaper publishing company, credit card company, financial agency, and communication service company.

As shown in FIG. 5b, the management table for the CTI request information database 202 consists of CTI request characteristic code 511, request list length 512, the first request 513, the second request 514 . . . , the n-th request 515.

The management table for the CTI request information database 202 contains a list of personal information for subscribers, in the CTI personal information database 112, who request the CTI processing to be carried. Accordingly, in this embodiment, useful personal information can be provided to the CTI destination terminals 16 and 17 without conveying unnecessary personal information.

As shown in FIG. 5c, the management table for the CTI announcement information database 203 is comprised of announcement information 521 and announcement broadcasting request code 522.

Figure 5D:
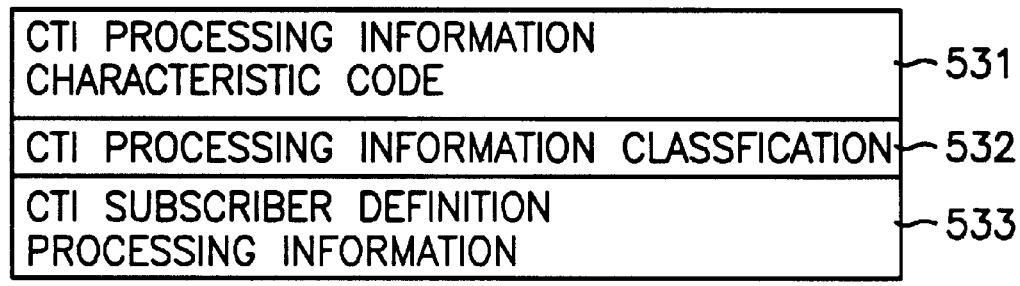

Referring to FIG. 5d, the management table for the CTI processing information database 205 includes CTI processing information characteristic code 531, CTI processing information classification 532, and CTI subscriber definition processing information 533.

Figure 5E:
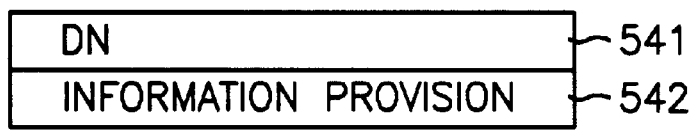
Figure 5F:
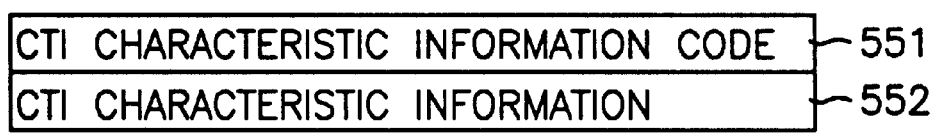

Referring to FIG. 5e, the management table for the CTI provision information database 206 consists of dialing number DN 541 and information provision 542. As shown in FIG. 5f, the management table for the CTI characteristic information database 208 is comprised of CTI characteristic information code 551 and CTI characteristic information 552.

The management table for the CTI announcement information database 203 (see FIG. 5c) and the management table for the CTI provision information database 206 (see FIG. 5f) is not retrieved by the CTI virtual number 501 but retrieved and executed by the logic structure of the service control system 11.

As a result, due to the announcement broadcasting and message information provided by the service control system 11, the intelligent network of this embodiment is changed into an active intelligent network from the prior inactive network, which has performed simply the number translation. Thanks to the active intelligent network, the originating and the destination subscribers can be provided with more useful information from the service control system 11.

The management table for the CTI announcement information database 203 (see FIG. 5c) has information for providing the announcement broadcasting for interaction of the users and for the intelligent network CTI.

The management table for the CTI information database 206 (see FIG. 5e) has data for providing the message information for the originating or the destination subscribers.

FIGS. 6a to 6f show the structures of management tables for the personal information database. Each of FIGS. 6a to 6f illustrates the structure of the management tables for each of database in the personal database 12 shown in FIG. 3 (i.e., the basic personal profile database 301, the personal routing information database 302, personal characteristic information database 303, the personal subscription information database 305, personal detail information database 306, and the personal history information database 307).

The management for the personal information database 112 contains data for the originating subscribers to be connected to the CTI destination terminals 16 and 17. Because the service control system 11 manages the personal information on the basis of the personal information database 12, the redundancy of data resulted from the management by each of the CTI server can be overcome.

As shown in FIG. 6a, the management table for the basic personal profile database 301 is consists of calling line identification (CLI) 601, resident registration number 602, address 603, name of work place 604, name of spouse 605, and nationality 606. The management table for the basic personal profile database 301 retrieves the basic personal information according to the CLI 601.

Referring to FIG. 6b, the management table for the personal routing information database 302 is comprised of CLI 611, routing condition 612 and routing preference information 613.

When compared with the convention intelligent network which providing routings by date and area, this invention can connect the originating terminals and the destination terminals (CTI terminals) 16 and 17 according to the routing condition and the routing preference information by using the management table for the personal routing information database 302. As a result, in this embodiment, the originating subscribers can choose a specific destination terminal.

As shown in FIG. 6c, the management table for the personal characteristic information database 303 includes CLI 621 and personal processing ability 622. The table for the personal characteristic information database 303 contains data concerning the specific processing ability of subscribers. For example, subscriber characteristic such as facsimile available, E-mail available, personal internet homepage available, VPN (Virtual Private Network) service subscription, and security required is indicated by the table.

Figure 6D:
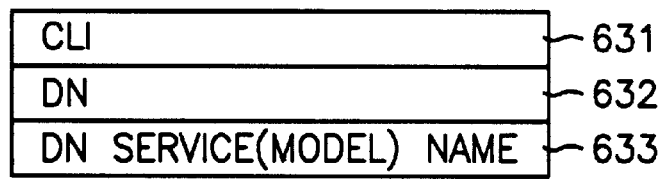

Referring to FIG. 6d, the management table for the personal subscription information database 305 consists of CLI 631, DN 632 and DN service (model) name 633. This table for the personal subscription information database 305 has different service (model) names for certain DN (CTI virtual number) for each subscriber.

Figure 6E:
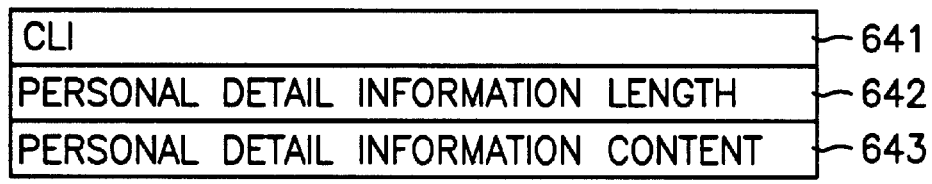

Referring FIG. 6e, the management table for the personal detail information database 306 is comprised of CLI 641, personal detail information length 642 and personal detail information 643. This table for the personal detail information database 306 has data managed by the subscriber.

Figure 6F:
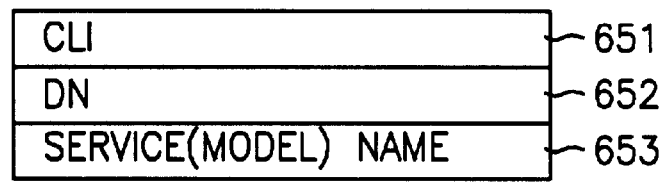

As shown in FIG. 6f, the management table for the personal history information database 307 includes CLI 651, DN 652, service (model) name (653), date of information change 654 and changed information item 655. This table of FIG. 6f contains the date of information change 654 and the changed information item 655 according to the DN 652 and the service (model) name 653.

In this embodiment, the CTI terminals 16 and 17 can receive, by the personal history information database 307, change history information as well as the subscriber's basic profile.

FIGS. 7a to 7c show structures of management tables for the destination information database according to the present invention. Each of FIGS. 7a to 7c illustrates the structures of corresponding management tables respectively for destination physical information database 401, destination area information database and destination preference information database 403 which are contained in the destination information database 13 shown in FIG. 4.

Referring to FIG. 7a, the management table for the destination physical information database 401 consists of DN 701, destination preference information code 702, destination area information code 703 and destination physical number 704.

As shown in FIG. 7b, the management table for the destination area information database 402 includes destination area information code 711 and destination area number 712.

As shown in FIG. 7c, the management table for the destination preference information database 404 is comprised of destination preference information code 721 and destination area number 722.

The table for the destination information database 113 is to translate the numbers into the destination physical number 704 according to the DN 701.

The conventional number translation can determine the destination physical number 704 by using only the destination area information code 704, while in the present invention the originating subscriber can select the destination physical number 704 by using the destination preference information code 702 according to the routing preference information 613 of the personal information. Further, the conventional system has a drawback in that the originating subscriber is continuously connected to unwanted destination subscribers because the originating and the destination subscribers are interconnected according to the routing information designated by the destination subscribers. In contrast, the present invention uses the destination preference information code 702, so that the originating subscribers can be connected to the intended destination subscribers.

Figure 8:
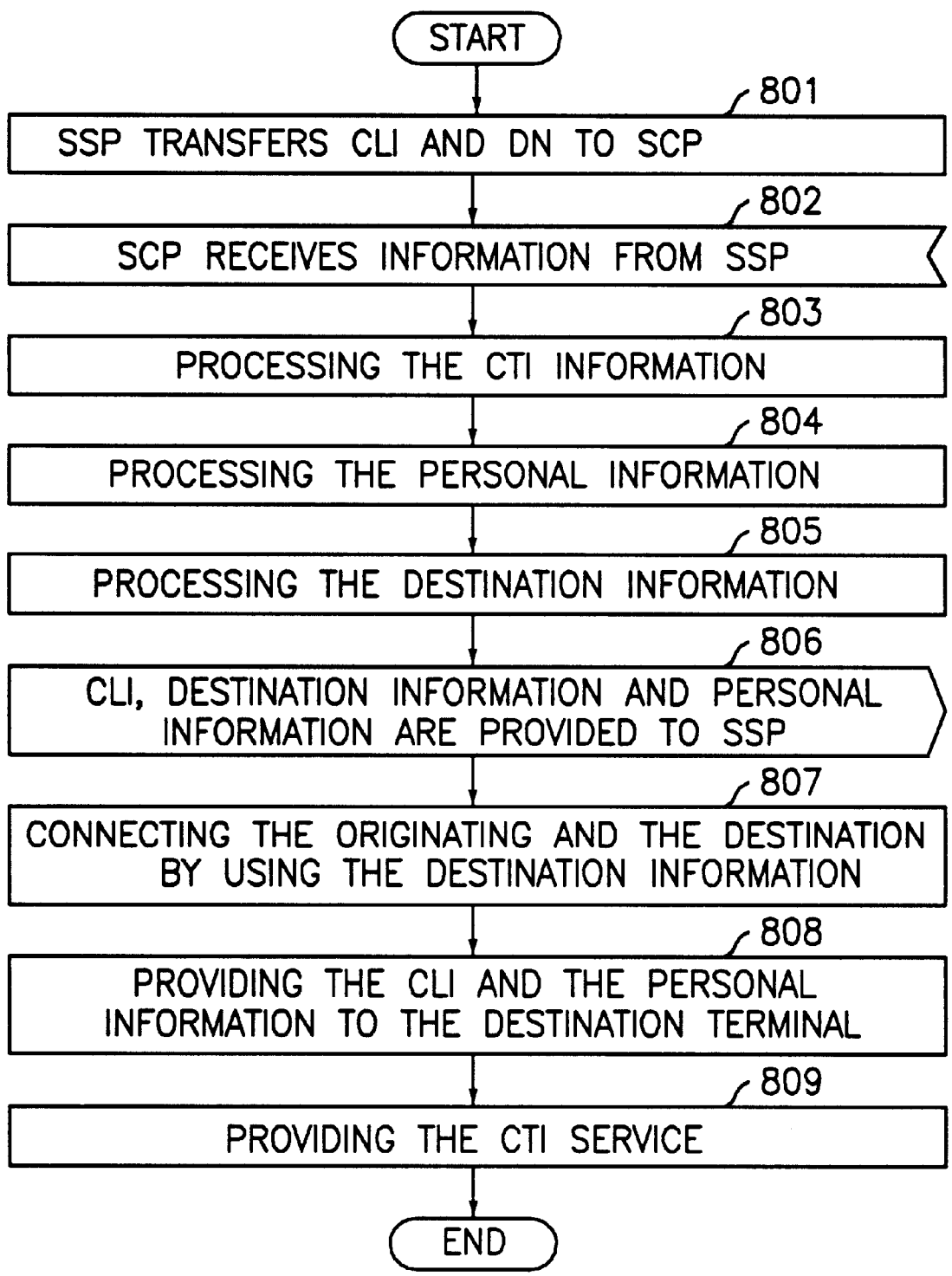
FIG. 8 a flow chart of personal information provision procedure of the present invention.

FIG. 8 is a flow chart of personal information provision procedure of the present invention.

Referring to FIG. 8, the method for providing personal information according to the present invention starts with transferring, at step 801, the DN and the CLI from the service exchange point (SSP) 12 to the service control system (SCP) 11, when an originating subscriber dials a call to the CTI intelligent network. When the SCP 11 receives the CLI and the DN from the SSP 12 (step 802), the SCP 11 processes the CTI information in the CTI information database 111 by using the DN (step 803).

More detail procedure of the CTI information processing is described as follow. First, the SCP 11 retrieves the CTI information database 111 with the CLI and the DN to verify that the numbers are equal to or not the call center operation numbers. If the numbers are determined to be the call center operation numbers, a personal information request necessary for the operation of the call center is issued to the personal information database 112. On the other hand, when the numbers are not the call center operation numbers, the SCP 11 retrieves the destination number database 113 to carry out the destination routing without retrieving the personal information database 112.

Then, the SCP 11 retrieves the personal information from the personal information database 112 with using the CLI (step 804). The SCP 11 retrieves the destination information (i.e., the address of the CTI terminals) by making use of the CLI and the DN (step 805).

The destination information (the address of the CTI terminal), personal number and the CLI retrieved by the SCP 11 is delivered to the SSP 12 (step 806). And then, the SSP 12 connects, by using the destination information, the originating and the destination subscribers through a telecommunication network (e.g., PSTN, ISDN, B-ISDN) (step 807). At the same time, the SSP 12 selects one of the CTI terminals 16 and 17 and provides the personal information to the selected terminal (step 808). Finally, the user of the destination CTI terminal 16 or 17 who is connected to the originating subscriber and provided with the personal information provides the CTI service (step 809).

As explained above, according to the present invention, the personal information is retrieved by the SCP 11 and provided to the CTI terminals 16 and 17 prior to the connection of the destination terminal (CTI terminal 16 and 17), so that the personal information can be delivered to the CTI users without imparting the capability of personal information retrieval to the CTI terminals 16 and 17. In this context, the present invention is different from the prior art system, in which the destination CTI terminals retrieve the personal information through the calling line identification (CLI).

Various modification and alterations of this invention will become apparent to those skilled in the art without departing from the scope and spirit of this invention. It should therefore be understood that this invention is not unduly limited to the illustrative embodiments set forth above, but it to be controlled by the limitations set forth in the claims and equivalents thereof.

What is claimed is:

1. A method for providing personal information in an intelligent network, comprising the steps of:

building a Computer Telephony Integration (CTI) information database, an personal information database, and a destination information database in a Service Control Point (SCP), to provide the personal information to CTI destination terminals in an intelligent network;

transferring, by a Service Exchange Point (SSP), a calling line identification (CLI) and a dialing number (DN) to the SCP when an originating subscriber initiates an originating call;

retrieving a personal information and a destination information from said databases;

transferring the CLI and the retrieved personal information and destination information to the SSP; and providing, by the SSP, the CLI and the personal information to the CTI destination terminals, wherein said CTI information database comprises:

a CTI subscription information database which verifies whether the DN received from the SSP is registered and, if so, retrieves and stores CTI request information;

a CTI announcement information database which contains an announcement broadcasting content and a message content necessary in the CTI processing;

a CTI information transfer processing block which manages the CTI information database;

a CTI processing information database which defines CTI processing information codes;

a CTI provision information database which defines the information provision according to the DN; and a CTI call originating block which determines whether the originating call is issued from the SSP.

2. The method of claim 1, wherein said personal information database comprises:

a basic personal profile database which contains fundamental data to every CTI subscriber;

a personal routing information database which designates a destination terminal a specific CTI subscriber prefers;

a personal characteristic information database which contains personal characteristic data pertaining to personal processing ability;

a personal subscription information database which contains DN services to which the CTI subscribers register;

a personal detail information database which contains detailed data of CTI subscribers which are not standardized;

a personal history information database which contains history data based on the DN and service names of CTI subscribers; and a personal information processing block which manages the basic personal profile database, the personal routing information database, the personal characteristic information database, the personal subscription information database, the personal detail information database, and the personal history information database.

3. The method of claim 1, wherein said destination information database comprises:

a destination physical information database which contains CTI a destination information for each of the DN;

a destination area information database which selects the CTI destination terminals according to the area of the originating subscriber;

a destination preference information database which selects the CTI destination terminals according to the personal information database of the originating subscriber; and a destination information processing block which selects the destination physical information database, the destination area information database, and the destination preference information database.

4. The method of claim 1, further comprising:

processing, by the SCP, the CTI information in the CTI information database by using, the DN, when the CLI and the DN are received by the SCP from the SSP;

retrieving, by the SCP, the personal information from the personal information database by using the CLI;

retrieving, by the SCP, the destination information by using the CLI and the DN; and providing, by the SCP, the CLI and the retrieved destination information and the personal information to the SSP.

5. The method of claim 4, wherein said step of processing the CTI information comprises the steps of:

verifying, after retrieving the CTI information database by using the CLI and the DN, whether the numbers are call center operation numbers; and issuing a personal information request necessary for the call center operation if the numbers are the call center operation numbers, while carrying out a destination routing after retrieving the destination number database but without retrieving the personal information database if the numbers are not the call center operation numbers.

6. The method of claim 4, wherein said CLI and said personal information are provided to the CTI destination terminals by:

connecting, by the SSP, the originating and the destination terminals through said intelligent network by using the destination information;

selecting, by the SSP, the destination terminal and providing the personal information at the same time of the connection of the originating and the destination terminals; and providing, by the CTI subscriber of the destination terminal connected to the originating subscriber, the CTI service.

7. A communication system comprising:

one or more destination terminals;

an originating terminal;

a plurality of Service Switching Exchange Points (SSPs) arranged to serve one or more destination terminals and the originating terminal; and a Service Control Point (SCP) configured to provide personal information to a destination terminal, upon a request from the originating terminal, via a corresponding SSP, said SCP comprising a Computer Telephony Integration (CTI) information database which contains information of CTI subscribers, a personal information database which contains personal information pertaining to the CTI subscribers, a destination information database which contains destination information pertaining to the CTI subscribers, wherein said corresponding SSP transfers a calling line identification (CLI) and a dialing number (DN) to the SCP when a CTI subscriber at the originating terminal registers the dialing Number (DN) of the destination terminal, retrieves personal information and destination information from said personal information database and said destination information database, and transfers the CLI and the personal information and destination information retrieved to the SSP;

wherein said SSP provides the CLI and the personal information to the destination terminal; and wherein said CTI information database comprises:

a CTI subscription information database which verifies whether the DN received from the SSP is registered and, if so, retrieves and writes CTI request information in a CTI request information database;

a CTI announcement information database which contains an announcement broadcasting content and a message content necessary in the CTI processing;

a CTI information transfer processing block which manages the CTI information database;

a CTI processing information database which defines CTI processing information codes;

a CTI provision information database which defines the information provision according to the DN; and a CTI call originating block which determines whether the originating call is issued from the SSP.

8. The communication system of claim 7, wherein said SCP processes the CTI information by using the DN, when the CLI and the DN are received from the SSP, retrieves the personal information from said personal information database by using the CLI, the destination information from said destination information database by using the CLI and the DN, and provides the CLI and the personal number and destination information retrieved to the SSP.

9. The communication system of claim 8, wherein said CTI information is processed by:

verifying, after retrieving from said CTI information database by using the CLI and the DN, whether the numbers are call center operation numbers; and issuing a personal information request necessary for the call center operation if the numbers are the call center operation numbers, while carrying out a destination routing after retrieving from said destination number database but without retrieving from said personal information database if the numbers are not the call center operation numbers.

10. The communication system of claim 8, wherein said SSP provides the CLI and personal information to the CTI destination terminal by first connecting the originating and the destination terminals using the destination information, and then providing CTI service to the CTI subscriber at the destination terminal connected to the originating terminal.

11. A communication system comprising:

one or more destination terminals;

an originating terminal;

a plurality of Service Switching Exchange Points (SSPs) arranged to serve one or more destination terminals and the originating terminal; and a Service Control Point (SCP) configured to provide personal information to a destination terminal, upon a request from the originating terminal, via a corresponding SSP, said SCP comprising a Computer Telephony Integration (CTI) information database which contains information of CTI subscribers, a personal information database which contains personal information pertaining to the CTI subscribers, a destination information database which contains destination information pertaining to the CTI subscribers, wherein said corresponding SSP transfers a calling line identification (CLI) and a dialing number (DN) to the SCP when a CTI subscriber at the originating terminal registers the dialing Number (DN) of the destination terminal, retrieves personal information and destination information from said personal information database and said destination information database, and transfers the CLI and the personal information and destination information retrieved to the SSP;

wherein said SSP provides the CLI and the personal information to the destination terminal; and wherein said personal information database comprises:
- a basic personal profile database which contains fundamental data to every CTI subscriber;
- a personal routing information database which designates a destination terminal a specific CTI subscriber prefers;
- a personal characteristic information database which contains personal characteristic data pertaining to personal processing ability;
- a personal subscription information database which contains DN services to which the CTI subscribers register;
- a personal detail information database which contains detailed data of CTI subscribers which are not standardized;
- a personal history information database which contains history data based on the DN and service names of CTI subscribers; and
- a personal information processing block which manages the basic personal profile database, the personal routing information database, the personal characteristic information database, the personal subscription information database, the personal detail information database, and the personal history information database.

12. The communication system of claim 11, wherein said SCP processes the CTI information by using the DN, when the CLI and the DN are received from the SSP, retrieves the personal information from said personal information database by using the CLI, the destination information from said destination information database by using the CLI and the DN, and provides the CLI and the personal number and destination information retrieved to the SSP.

13. The communication system of claim 12, wherein said CTI information is processed by:
- verifying, after retrieving from said CTI information database by using the CLI and the DN, whether the numbers are call center operation numbers; and
- issuing a personal information request necessary for the call center operation if the numbers are the call center operation numbers, while carrying out a destination routing after retrieving from said destination number database but without retrieving from said personal information database if the numbers are not the call center operation numbers.

14. The communication system of claim 12, wherein said SSP provides the CLI and personal information to the CTI destination terminal by first connecting the originating and the destination terminals using the destination information, and then providing CTI service to the CTI subscriber at the destination terminal connected to the originating terminal.

15. A communication system comprising:
one or more destination terminals;
an originating terminal;
a plurality of Service Switching Exchange Points (SSPs) arranged to serve one or more destination terminals and the originating terminal; and
a Service Control Point (SCP) configured to provide personal information to a destination terminal, upon a request from the originating terminal, via a corresponding SSP, said SCP comprising a Computer Telephony Integration (CTI) information database which contains information of CTI subscribers, a personal information database which contains personal information pertaining to the CTI subscribers, a destination information database which contains destination information pertaining to the CTI subscribers, wherein said corresponding SSP transfers a calling line identification (CLI) and a dialing number (DN) to the SCP when a CTI subscriber at the originating terminal registers the dialing Number (DN) of the destination terminal, retrieves personal information and destination information from said personal information database and said destination information database, and transfers the CLI and the personal information and destination information retrieved to the SSP;

wherein said SSP provides the CLI and the personal information to the destination terminal; and wherein said destination information database comprises:
- a destination physical information database which contains CTI destination information for each of the DN;
- a destination area information database which selects the CTI destination terminals according to the area of the originating subscriber;
- a destination preference information database which selects the CTI destination terminals according to the personal information database of the originating subscriber; and
- a destination information processing block which selects the destination physical information database, the destination area information database, and the destination preference information database.

16. The communication system of claim 15, wherein said SCP processes the CTI information by using the DN, when the CLI and the DN are received from the SSP, retrieves the personal information from said personal information database by using the CLI, the destination information from said destination information database by using the CLI and the DN, and provides the CLI and the personal number and destination information retrieved to the SSP.

17. The communication system of claim 15, wherein said CTI information is processed by:
- verifying, after retrieving from said CTI information database by using the CLI and the DN, whether the numbers are call center operation numbers; and
- issuing a personal information request necessary for the call center operation if the numbers are the call center operation numbers, while carrying out a destination routing after retrieving from said destination number database but without retrieving from said personal information database if the numbers are not the call center operation numbers.

18. The communication system of claim 15, wherein said SSP provides the CLI and personal information to the CTI destination terminal by first connecting the originating and the destination terminals using the destination information, and then providing CTI service to the CTI subscriber at the destination terminal connected to the originating terminal.

* * * * *